(12) United States Patent
Kimura

(10) Patent No.: US 10,011,069 B2
(45) Date of Patent: Jul. 3, 2018

(54) MOLDING DEVICE AND MOLDING METHOD OF A FUEL TANK FLANGE SECTION

(71) Applicant: Toyota Jidosha Kabushiki Kaisha, Toyota-shi, Aichi-ken (JP)

(72) Inventor: Miki Kimura, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 261 days.

(21) Appl. No.: 15/078,690

(22) Filed: Mar. 23, 2016

(65) Prior Publication Data
US 2016/0288400 A1 Oct. 6, 2016

(30) Foreign Application Priority Data
Apr. 2, 2015 (JP) .................. 2015-076219

(51) Int. Cl.
| | |
|---|---|
| B29C 51/10 | (2006.01) |
| B29C 51/32 | (2006.01) |
| B29C 51/08 | (2006.01) |
| B29K 105/00 | (2006.01) |
| B29L 31/00 | (2006.01) |

(52) U.S. Cl.
CPC ............ B29C 51/32 (2013.01); B29C 51/082 (2013.01); *B29K 2105/256* (2013.01); *B29L 2031/7172* (2013.01)

(58) Field of Classification Search
CPC ....... B29C 43/32; B29C 43/361; B29C 51/10; B29C 51/18; B29C 65/02; B29C 51/06; B29C 51/30; B29C 51/12; B29L 2031/7288; B29L 2031/7172; B29K 2023/065; B29K 2023/086
USPC .................. 425/188, 193–195, 409
See application file for complete search history.

(56) References Cited

U.S. PATENT DOCUMENTS

| | | | |
|---|---|---|---|
| 6,261,504 B1 * | 7/2001 | Baker ................ | B29C 33/44 264/318 |
| 2007/0065612 A1 | 3/2007 | Yamamoto et al. | |
| 2009/0047375 A1 | 2/2009 | Borchert et al. | |

(Continued)

FOREIGN PATENT DOCUMENTS

| | | |
|---|---|---|
| EP | 0894602 A1 | 2/1999 |
| JP | S52032060 A | 3/1977 |
| JP | S63004932 A | 1/1988 |

(Continued)

*Primary Examiner* — Joseph S Del Sole
*Assistant Examiner* — Thukhanh T Nguyen
(74) *Attorney, Agent, or Firm* — Dinsmore & Shohl LLP

(57) ABSTRACT

A fuel tank flange section molding device including: upper and lower molds that are closed together to mold a fuel tank; a fixed section that controls an amount of molten resin flowing toward a fuel tank main body side due to the protruding portion being disposed nearer to the lower mold side than the mold face when the upper and lower molds have been closed together; a flange insert that includes a mold face capable of rotating about the fixed section to an angle sloped toward a retracting direction of the upper mold, with respect to an extension direction of the flange section; and a cut-off insert that includes a mold face that forms an end portion of the flange section at the opposite side from the fuel tank main body, and that is capable of retracting from the upper mold with respect to the lower mold.

6 Claims, 11 Drawing Sheets

(56) References Cited

U.S. PATENT DOCUMENTS

2011/0221104 A1    9/2011  Criel et al.

FOREIGN PATENT DOCUMENTS

| JP | H05050499 A | 3/1993 |
| JP | H07171887 A | 7/1995 |
| JP | H11123741 A | 5/1999 |
| JP | 2000-085336 A | 3/2000 |
| JP | 2005-153518 A | 6/2005 |
| JP | 2007-084092 A | 4/2007 |
| JP | 2008-155588 A | 7/2008 |
| JP | 2009-539639 A | 11/2009 |
| JP | 2012-158186 A | 8/2012 |
| WO | 2014170302 A1 | 10/2014 |

\* cited by examiner

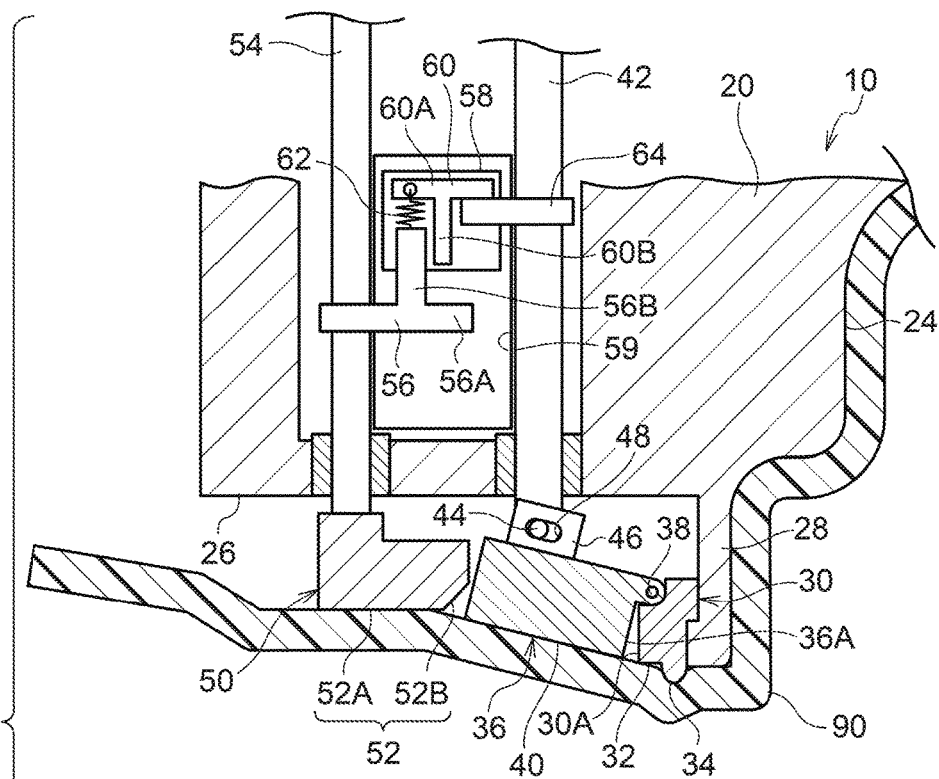
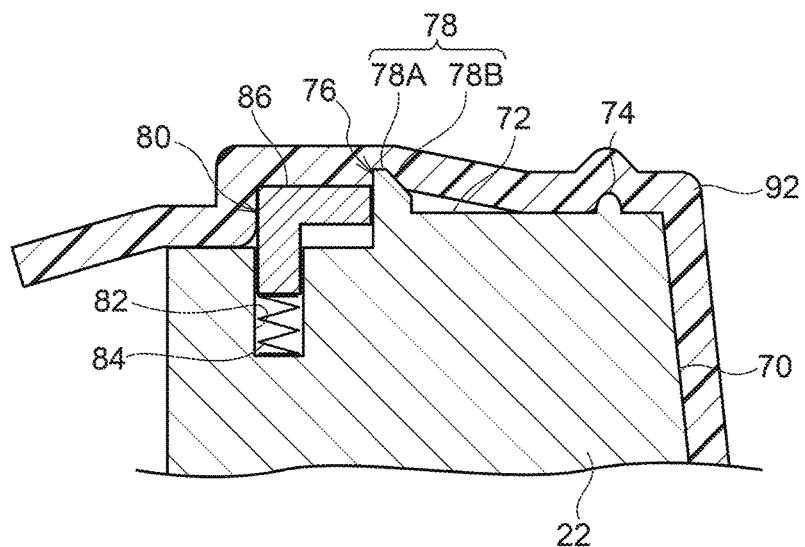
FIG.3

MOLDING DEVICE AND MOLDING METHOD OF A FUEL TANK FLANGE SECTION

CROSS-REFERENCE TO RELATED APPLICATION

This application is based on and claims priority under 35 USC 119 from Japanese Patent Application No. 2015-076219 filed on Apr. 2, 2015, the disclosure of which is incorporated by reference herein.

BACKGROUND

Technical Field

The present disclosure relates to a molding device and molding method of a fuel tank flange section.

Related Art

Conventionally, in fuel tanks molded of resin, sheet shaped parisons (sheet bodies) formed of molten resin are respectively vacuum shaped by an upper mold and a lower mold, and a hollow bodied fuel tank is molded by closing the upper mold and the lower mold together. When this is performed, a flange section is formed to the fuel tank by joining together respective end portions of the sheet bodies (see, for example, Japanese Patent Application Laid-Open (JP-A) No. 2008-155588).

When forming the flange section to the fuel tank, the end portions of the sheet bodies (molten resin) that have been shaped by the upper mold and the lower mold are joined by closing the upper mold and the lower mold, each provided with a flange mold face, together and molding the flange section into a specific shape. When this is performed, recessed portions are formed on the surface of the sheet bodies by local variation in the shrinkage arising from heat radiating from the sheet bodies. There is accordingly a concern that air remains present at positions inside the recessed portions of the sheet body, at the inside of any flange sections that have been molded by joining together sheet bodies.

The joint strength of the flange section decreases when air remains between the joint faces of flange sections in this manner.

SUMMARY

In consideration of the above circumstances, an object of the present disclosure is to provide a molding device and molding method of a fuel tank flange section that suppresses air from remaining between joint faces of a flange section.

A first aspect of the present disclosure includes: an upper mold and a lower mold that are closed to mold a fuel tank; a fixed section that is fixed to the upper mold, that includes a mold face for molding a flange section extending from an outside face of a side wall of a fuel tank main body of the fuel tank in a direction intersecting with the outside face and a protruding portion projecting out from the mold face toward the lower mold side, and that controls the amount of molten resin flowing toward the fuel tank main body side due to the protruding portion being disposed nearer to the lower mold side than the mold face when the molds have been closed together; a flange insert that is provided adjacent to the fixed section in the upper mold at the opposite side to the fuel tank main body side, and that includes a mold face formed capable of rotating about the fixed section to an angle sloped toward a retracting direction of the upper mold, with respect to an extension direction of the flange section; and a cut-off insert that is provided adjacent to the flange insert in the upper mold at the opposite side to the fuel tank main body side, that includes a mold face for forming an end portion of the flange section at the opposite side to the fuel tank main body, and that is provided so as to be capable of retracting from the upper mold with respect to the lower mold.

In this fuel tank flange section molding device, the mold face of the flange insert is formed capable of rotating, thereby enabling the mold face of the flange insert to be sloped so as to be positioned in the retreating direction of the upper mold on progression along the extension direction of the flange portion.

The mold face of the flange insert, which had been sloped in the retreating direction of the upper mold (away from the lower mold) on progression along the extension direction of the flange portion during shaping, is rotated about the fixed section so as to be at the same height as the mold face of the fixed section during joining. Excess molten resin is pressed from the fuel tank main body side (hereafter sometimes referred to as "inside") toward the opposite side to the fuel tank main body side (hereafter sometimes referred to as "outside") by rotating the mold face. Next, by making the cut-off insert advance toward the lower mold side, excess molten resin is further pressed from the inside toward the outside, at the same time as an outside end portion of the flange section is cut to mold the end portion of the flange section.

The flange section is molded in this manner. Namely, molten resin that is excess to the molding of the flange section is pressed in sequence from the inside to the outside by the fixed section, the flange insert, and the cut-off insert, such that air that was positioned between the melted resin shaped by the upper mold and the lower mold is also well dispelled toward the outside. Air is thereby suppressed from being present between the molten resin joint faces that form the flange section.

A second aspect of the present disclosure is the first aspect, wherein the flange insert follows driving of the cut-off insert.

In this fuel tank flange section molding device, the flange insert is configured so as to follow the driving of the cut-off insert. Thus, one single drive source is sufficient in order to drive both the flange insert and the cut-off insert.

A third aspect of the present disclosure includes: a first process of, in the fuel tank flange section molding device of the first aspect, respectively shaping sheet bodies formed from molten resin in the upper mold and the lower mold; a second process of disposing the fixed section with respect to the lower mold in a position for molding the flange section by closing the upper mold and the lower mold; a third process of rotating the flange insert about the fixed section, such that, from the state sloped toward the retracting direction of the upper mold, with respect to the extension direction of the flange section, the mold face of the flange insert is at the same height as the mold face of the fixed section; and a fourth process of causing the cut-off insert to advance toward the lower mold, and to be abutted by the lower mold.

In this fuel tank flange section molding method, first, the sheet bodies are shaped by the upper mold and the lower mold. Next, the fixed section is disposed in a position forming the flange section when the upper mold and the lower mold are closed together, such that the respective shaped sheet bodies are joined together between the fixed section and the lower mold. Next, the mold face of the flange insert, which was sloped in the upper mold retracting direction on progression along the flange section extension direction, rotates about the fixed section to be at the same height as the mold face of the fixed section, and the respective shaped sheet bodies are joined together from the inside between the flange insert and the lower mold. The cut-off insert is then abutted by the lower mold, such that the sheet bodies are joined together between the cut-off insert and the lower mold, and portions forming the end portion of the flange section are cut to mold the flange section.

The sheet bodies that have been shaped by the upper mold and the lower mold are accordingly joined together from the inside, such that molten resin that is excess in molding the flange section is pressed from the inside toward the outside. Air that was present between the sheet bodies is thereby dispelled toward the outside. Air is thereby suppressed from remaining between the joint faces of the sheet bodies in the molded flange section.

A fourth aspect of the present disclosure is the third aspect of the present disclosure, wherein in the first process, the sheet bodies formed from molten resin in the lower mold and the upper mold are shaped in a state in which the mold face of the flange insert is sloped in the retracting direction of the upper mold, with respect to the extension direction of the flange section, an end portion of the mold face of the fixed section at the opposite side to the fuel tank main body and an end portion of the mold face of the flange insert at the fuel tank main body side are at substantially the same height as each other, and an end portion of the mold face of the cut-off insert at the fuel tank main body side and an end portion of the mold face of the flange insert at the opposite side to the fuel tank main body are at substantially the same height as each other.

In this fuel tank flange section molding method, when the sheet bodies, formed from the molten resin at the respective mold faces of the fixed section, the flange insert, and the cut-off insert provided to the flange mold face in the upper mold, are shaped, the inside end portion of the mold face of the flange insert, sloping along the upper mold retracting direction on progression along the flange section extension direction, and the outside end portion of the mold face of the fixed section are at substantially the same height as each other, and the outside end portion of the mold face of the flange insert and the inside end portion of the mold face of the cut-off insert are at substantially the same height as each other. Namely, there is almost no unevenness between the outside end portion of the mold face of the fixed portion and the inside end portion of the mold face of the flange insert, or between the outside end portion of the mold face of the flange insert and the inside end portion of the cut-off insert, which are respectively positioned adjacent to each other, thereby suppressing a recessed portion from being formed in the shaped sheet bodies.

Air is accordingly further suppressed from remaining between the joint faces of the sheet bodies in the molded flange section.

A fifth aspect of the present disclosure includes: an upper mold and a lower mold that are closed together to mold a fuel tank; a fixed section that is fixed to the upper mold, that includes a mold face for molding a flange section extending from an outside face of a side wall of a fuel tank main body of the fuel tank in a direction intersecting with the outside face and a protruding portion projecting out from the mold face toward the lower mold side, and that controls the amount of molten resin flowing toward the fuel tank main body side due to the protruding portion being disposed nearer to the lower mold side than the mold face when the molds have been closed together; a flange insert that is provided adjacent to the fixed section in the upper mold at the opposite side to the fuel tank main body, that includes a mold face for molding the flange section, and that is provided so as to be capable of advancing and retracting from the upper mold with respect to the lower mold; and a cut-off insert that is provided adjacent to the flange insert in the upper mold at the opposite side to the fuel tank main body, that includes a mold face forming an end portion of the flange section at the opposite side to the fuel tank main body, and that is provided so as to be capable of advancing and retracting from the upper mold with respect to the lower mold.

In this fuel tank flange section molding device, the mold face of the flange insert is made to retract further in the upper mold retracting direction than the mold face of the fixed portion, and the mold face of the cut-off insert is made to retract in the upper mold retracting direction to the same height as the mold face of the flange insert, or further, prior to closing the sheet bodies shaped by the upper mold and the lower mold between the molds. After the upper mold and the lower mold have been closed together, the mold face of the flange insert is then made to advance toward the lower mold side to reach the height of the mold face of the fixed section. Next, the cut-off insert is made to advance until abutting the lower mold. The flange section is thereby molded by joining together the sheet bodies in sequence from the inside, and cutting the outside end portions of the sheet bodies joined together by the cut-off insert. Since the sheet bodies are joined together in sequence from the inside in this manner, the sheet bodies (molten resin) that is excess to the molding of the flange section is pressed from the inside toward the outside, and air that was positioned between the sheet bodies is well dispelled toward the outside of the flange section. Namely, air is suppressed from remaining inside the molded flange section.

A sixth aspect of the present disclosure includes: a first process of, in the fuel tank flange section molding device of the fifth aspect, shaping sheet bodies formed from molten resin in the upper mold and the lower mold, in a state in which the respective mold faces of the fixed section, the flange insert, and the cut-off insert are at substantially the same height as each other; a second process of, when the upper mold and the lower mold are being closed together, relatively retracting the mold face of the flange insert in a retracting direction of the upper mold, with respect to the mold face of the fixed section, relatively retracting the mold face of the cut-off insert in the upper mold retracting direction to the position of the mold face of the flange insert, or further, and disposing the fixed section with respect to the lower mold in a position for molding the flange section by closing the upper mold and the lower mold together; a third process of causing the flange insert to advance toward the lower mold, so as to be at the same height as the mold face of the fixed section; and a fourth process of causing the cut-off insert to advance further toward the lower mold side than the flange insert, and to be abutted by the lower mold.

In this fuel tank flange section molding method, when the melted resin portions forming the flange section are joined together, first, the mold face of the flange insert is set in a position retracted in the upper mold retracting direction with respect to the mold face of the fixed portion that is positioned furthest inside, and the mold face of the cut-off insert is positioned retracted to the same position, or further in the upper mold retracting direction than the mold face of the flange insert. The flange insert is then made to advance toward the lower mold side, and the cut-off insert is then made to advance toward the lower mold side. The sheet bodies that form the joint faces are thereby joined together from the inside in sequence from the fixed section side to the flange insert and cut-off insert side, and excess molten resin is dispelled toward the outside. Air that was positioned between the sheet bodies in the upper mold and the lower mold is thereby dispelled outward without remaining between the joint faces, and air is suppressed from remaining between the joint faces of the flange section.

In the state in which the respective mold faces of the fixed section, the flange insert, and the cut-off insert provided in the upper mold are at substantially the same height, the sheet shaped molten resin (sheet bodies) is shaped by the respective mold faces. Thus, when the sheet bodies are being shaped, there is almost no unevenness between the mold face of the fixed section and the adjacent mold face of the flange insert, or between the mold face of the flange insert and the mold face of the cut-off insert, and a recessed portion, where there would be concern of air remaining, is suppressed from being formed in the shaped sheet bodies.

The first, and third to sixth aspects of the present disclosure are configured as described above, thereby enabling air to be suppressed from remaining between the joint faces of the flange section of the fuel tank.

The second aspect of the present disclosure is configured as described above, thereby enabling the flange insert and the cut-off insert to be driven by a single drive source.

BRIEF DESCRIPTION OF THE DRAWINGS

Exemplary embodiments of the present disclosure will be described in detail based on the following figures, wherein:

FIG. 3 is a vertical cross-section of relevant portions, illustrating a vacuum shaped state in a fuel tank flange section molding method according to the first exemplary embodiment;

DETAILED DESCRIPTION

First Exemplary Embodiment

Explanation follows regarding a fuel tank flange section molding device, and regarding a fuel tank flange section molding method using the molding device, according to a first exemplary embodiment of the present disclosure.

Figure 1:
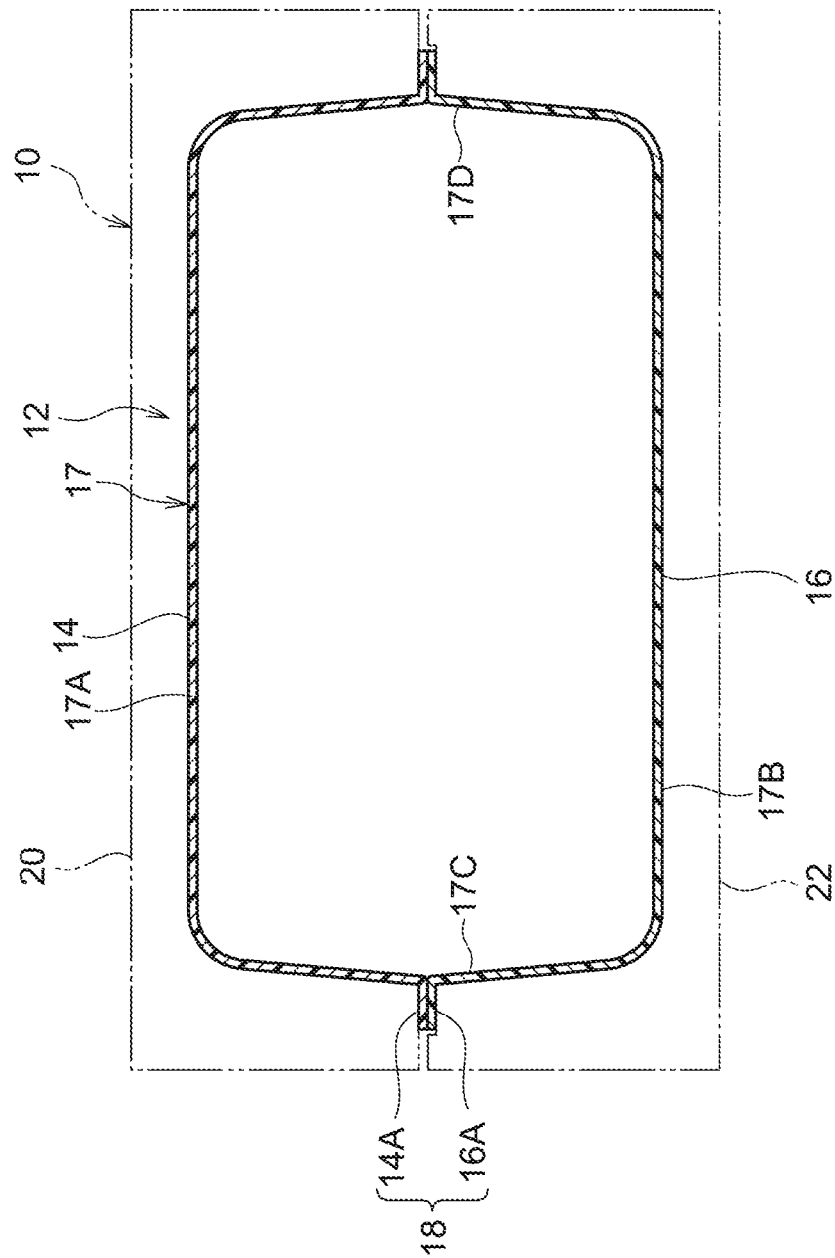
FIG. 1 is a schematic diagram illustrating a fuel tank flange section molding device according to a first exemplary embodiment, and a fuel tank formed by the molding device.

As illustrated in FIG. 1, a fuel tank flange section molding device (hereafter sometimes referred to as "molding device") 10 is a molding device for molding a fuel tank 12, illustrated in FIG. 1. The fuel tank 12 is formed as an integral unit by joining together respective flange portions 14A, 16A of an upper side mold body 14 and a lower side mold body 16, each with a hat shaped cross-section. The fuel tank 12 includes a fuel tank main body 17 that is formed by a portion excluding the respective flange portions 14A, 16A of the upper side mold body 14 and the lower side mold body 16 and in which fuel is stored, and a flange section 18 that is formed by joining together the flange portion 14A and the flange portion 16A. The fuel tank main body 17 includes an upper wall 17A, a lower wall 17B, and side walls 17C, 17D. The fuel tank 12 is attached to a vehicle body by fastening the flange section 18 to the vehicle body.

As illustrated by the double-dotted dashed line in FIG. 1, the molding device 10 includes an upper mold 20 and a lower mold 22 for molding the fuel tank 12. Portions of the upper mold 20 and the lower mold 22 for molding the flange section 18 of the fuel tank 12 are illustrated in FIG. 2.

Figure 2:
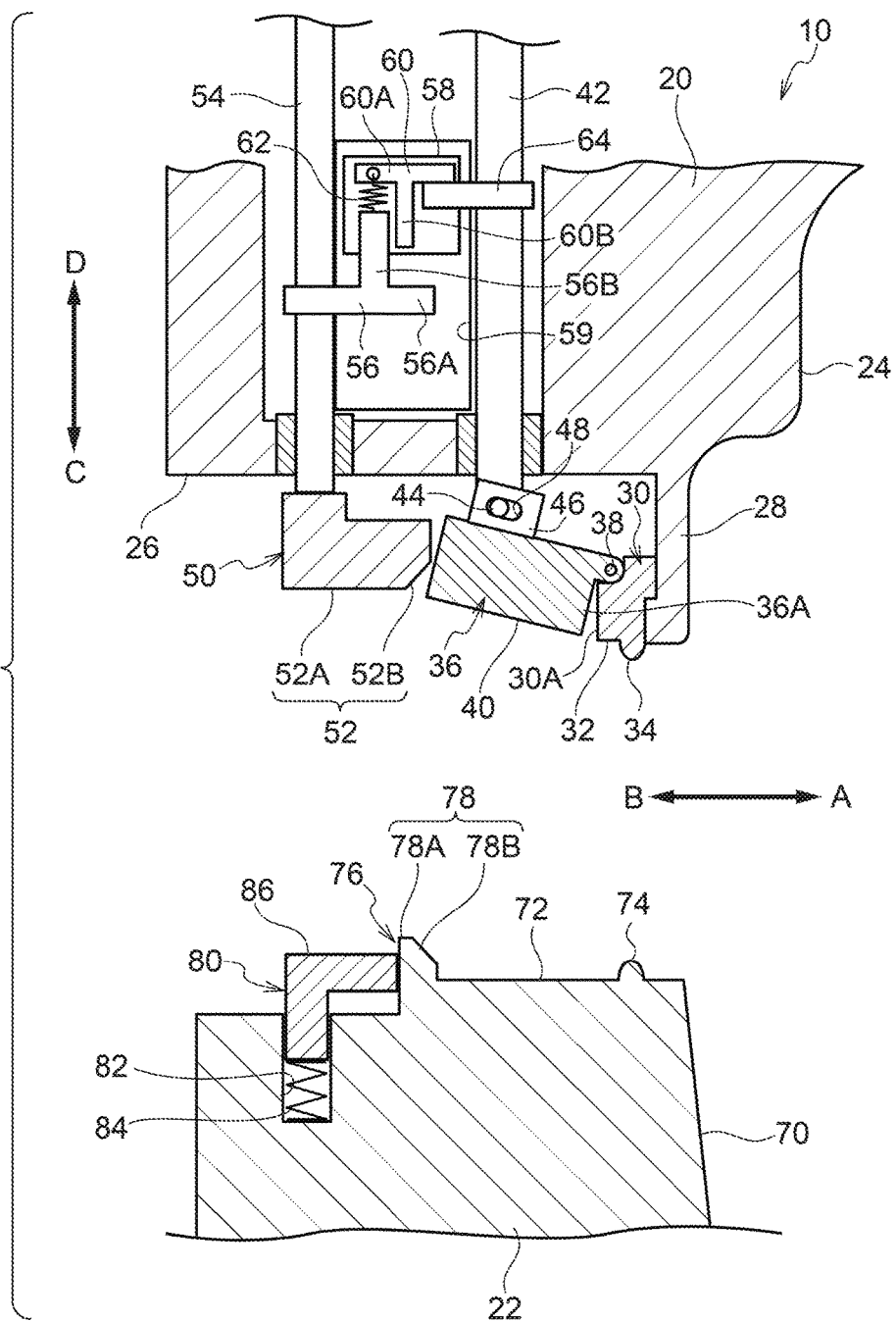
FIG. 2 is a vertical cross-section of relevant portions of a fuel tank flange section molding device according to the first exemplary embodiment.

FIG. 2 illustrates a state when the upper mold 20 and the lower mold 22 have been opened. As illustrated in FIG. 2, a general face 24, for molding the fuel tank main body that stores fuel, is formed on the upper mold 20 at the inside (the upper right side in FIG. 2), and a flange face 26, for molding the flange section 18, is formed at the lower side.

Note that "inside" referred to herein refers to the general face 24 side of the flange section 18 where the fuel tank main body 17 is formed (see the arrow A direction in FIG. 2), and "outside" referred to herein refers to the opposite side to the inside of the flange section 18 (see the arrow B direction in FIG. 2). "Inside" in the present exemplary embodiment corresponds to the "fuel tank main body side" of the present disclosure, and "outside" in the present exemplary embodiment corresponds to the "extension direction of the flange section" and the "opposite side to the fuel tank main body" of the present disclosure.

"Lower" refers to the direction in which the upper mold 20 is closed (see the arrow C direction in FIG. 2), and "upper" refers to the direction in which the upper mold 20 is opened (see the arrow D direction in FIG. 2). "Lower" in the present exemplary embodiment corresponds to the "lower mold side" and "toward the lower mold" of the present disclosure, and "upper" in the present exemplary embodiment corresponds to the "upper mold retracting direction" of the present disclosure.

A bulge portion 28 that projects out toward the lower side is formed to an inside end portion of the flange face 26, and a fixed section 30 is fixed to an outside face of a lower leading end of the bulge portion 28. The fixed section 30 has a substantially rectangular shaped cross-section, and a lower face thereof configures a mold face 32. The mold face 32 is formed with a protruding portion 34 that projects downward.

Note that, although the fixed section 30 is formed separately from the bulge portion 28 (upper mold 20) in the present exemplary embodiment, an integral unit may be formed.

A flange insert 36 with a substantially rectangular shaped cross-section is provided at the outside of the fixed section 30. The flange insert 36 is rotatably supported by the fixed section 30 through a shaft body 38. A mold face 40, this being a planar face, is formed at the lower side of the flange insert 36.

Note that, in the flange insert 36, a pin 44, formed at a leading end of a rod 42 that is capable of advancing and receding (moving up and down) with respect to the upper mold 20, is inserted into an elongated hole 48 of an engagement portion 46 provided to the flange insert 36. Configuration is thereby such that the pin 44 moves relatively inside the elongated hole 48 of the engagement portion 46 of the flange insert 36, and the flange insert 36 rotates about the shaft body 38 relative to the fixed section 30, due to the rod 42 advancing and retracting (moving in the up-down direction) with respect to the upper mold 20.

A cut-off insert 50 is provided at the outside of the flange insert 36. A mold face 52 is formed at the lower side of the cut-off insert 50. The mold face 52 includes a planar face 52A extending along the in-out direction, and a sloped face 52B that slopes upward on progression from an inside end portion of the planar face 52A toward the inside. The cut-off insert 50 is fixed to a leading end of a rod 54 that is configured capable of advancing and retracting with respect to the upper mold 20. The cut-off insert 50 is capable of advancing and retracting with respect to the lower mold 22 by moving the rod 54 up and down by driving a drive source, not illustrated in the drawings.

A transmission member 56 is fixed to the rod 54. The transmission member 56 is formed overall in an inverted T shape, including a horizontal portion 56A that extends along the in-out direction and a vertical portion 56B that extends upward from substantially the in-out direction center of the horizontal portion 56A.

An anchor member 60, fixed to a transmission portion 58, is provided above the transmission member 56. The anchor member 60 includes a horizontal portion 60A that extends along the in-out direction, and a vertical portion 60B that extends vertically downward from substantially the in-out direction center of the horizontal portion 60A. The vertical portion 56B of the transmission member 56 and the horizontal portion 60A of the anchor member 60 are connected by a spring 62.

The transmission portion 58 to which the anchor member 60 is fixed has a substantially rectangular shaped body, and is disposed so as to be capable of moving in the up-down direction inside a groove 59 provided inside the upper mold 20.

The rod 42 is provided with a bar 64 extending toward the outside. The rod 42 is capable of moving downward due to the horizontal portion 60A of the anchor member 60 pressing the bar 64 from above. The rod 42 is capable of moving upward due to the horizontal portion 56A of the transmission member 56 pressing the bar 64 from below. Configuration is thereby such that, when the rod 54 is relatively displaced in the up-down direction with respect to the upper mold 20 due to the drive source of the rod 54 being driven, the rod 42 is displaced in the up-down direction due to the horizontal portion 60A or the horizontal portion 56A pressing the bar 64, and the flange insert 36 rotates about the shaft body 38.

As illustrated in FIG. 2, the lower mold 22 is formed with a general face 70 for molding the fuel tank main body at the inside (the lower right side in FIG. 2), and is formed with a flange face 72 for molding the flange section 18 at the upper side thereof, similarly to in the upper mold 20.

A protruding portion 74, which faces the protruding portion 34 of the fixed section 30 across a specific distance when the upper mold 20 and the lower mold 22 have been closed together, is formed projecting out from the flange face 72 in the vicinity of an inside end portion thereof. A portion of the flange face 72 that faces the cut-off insert 50 in the upper mold 20 is formed with an abutting portion 76 projecting out therefrom, which is abutted by the cut-off insert 50 while molding the flange in order to cut the sheet shaped molten resin (hereafter sometimes referred to as "sheet bodies"). The abutting portion 76 is formed with a mold face 78, which includes a planar face 78A extending along the in-out direction, and a sloped face 78B sloping downward on progression from an inside end portion of the planar face 78A toward the inside. Note that the planar face 52A of the cut-off insert 50 abuts the planar face 78A of the abutting portion 76 to cut the sheet bodies, and the sloped face 52B of the cut-off insert 50 and the sloped face 78B of the abutting portion 76 face each other to form an outside end portion of the flange section 18.

Note that a support member 80 with an L-shaped cross-section is disposed at the outside of the abutting portion 76 on the flange face 72. The support member 80 is supported with a specific elastic force by a spring 84 provided in a recessed portion 82 formed to the flange face 72. A facing face 86 of the support member 80, which faces the cut-off insert 50, is positioned further downward than the planar face 78A of the abutting portion 76, and supports sheet bodies 90, 92 between the facing face 86 and the cut-off insert 50 with a specific pressure during flange molding.

Explanation follows regarding the fuel tank flange section molding method according to the present exemplary embodiment, employing the molding device 10 formed as described above.

First, as illustrated in FIG. 3, in an opened state of the upper mold 20 and lower mold 22 of the molding device 10, the sheet bodies 90, 92 are shaped by the respective general faces 24, 70 and flange faces 26, 72 of the upper mold 20 and lower mold 22 by suction with a negative pressure. When this is performed, as illustrated in FIGS. 2 and 3, the fixed section 30, the flange insert 36, and the cut-off insert 50 are disposed on the flange face 26 of the upper mold 20, and the sheet body 90 is shaped by the respective mold faces 32, 40, 52 of the fixed section 30, the flange insert 36, and the cut-off insert 50.

Note that, as illustrated in FIG. 3, the mold face 40 of the flange insert 36 is sloped upward on progression toward the outside. The mold face 52 of the cut-off insert 50 is in a position that is retracted upward with respect to the mold face 32 of the fixed section 30.

Figure 4:
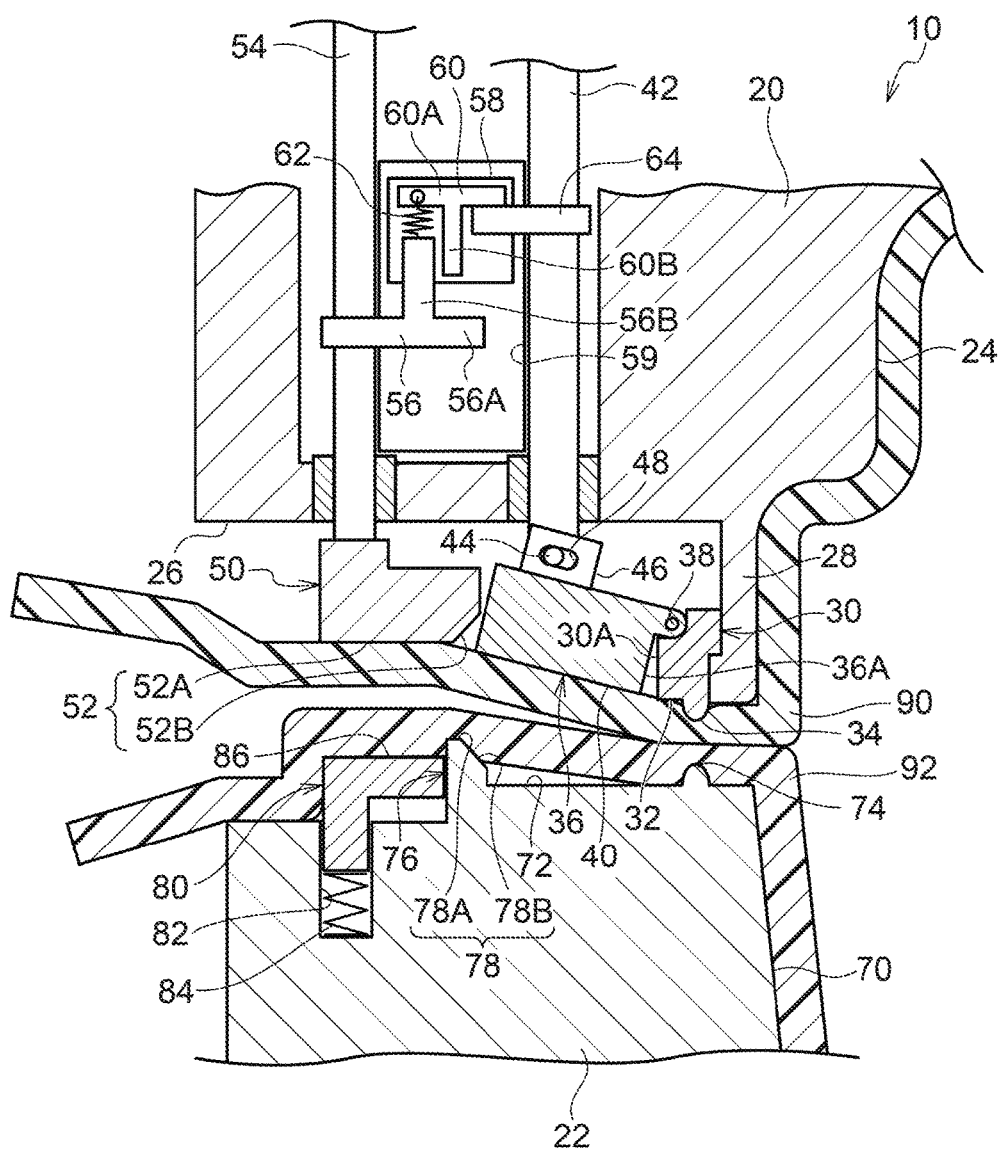
FIG. 4 is a vertical cross-section of relevant portions, illustrating a closed mold state in a fuel tank flange section molding method according to the first exemplary embodiment.

Next, as illustrated in FIG. 4, the upper mold 20 and the lower mold 22 are brought nearer to each other and closed together. The protruding portion 34 of the fixed section 30 and the protruding portion 74 of the lower mold 22 are thereby disposed in positions separated from each other by a specific distance, where the flange section 18 is molded. Portions of the sheet bodies 90, 92 that form the flange section 18 in the vicinity of the protruding portions 34, 74, are accordingly joined together. Note that the distance between the protruding portion 34 and the protruding portion 74 is set shorter than the distance between the mold face 40 of the flange insert 36 and the flange face 72 of the lower mold 22, described later, in order to control the flow rate of molten resin pressed toward the inside (the general face 24 side) when molding the flange section 18 (when joining the sheet bodies 90, 92 together).

Figure 5:
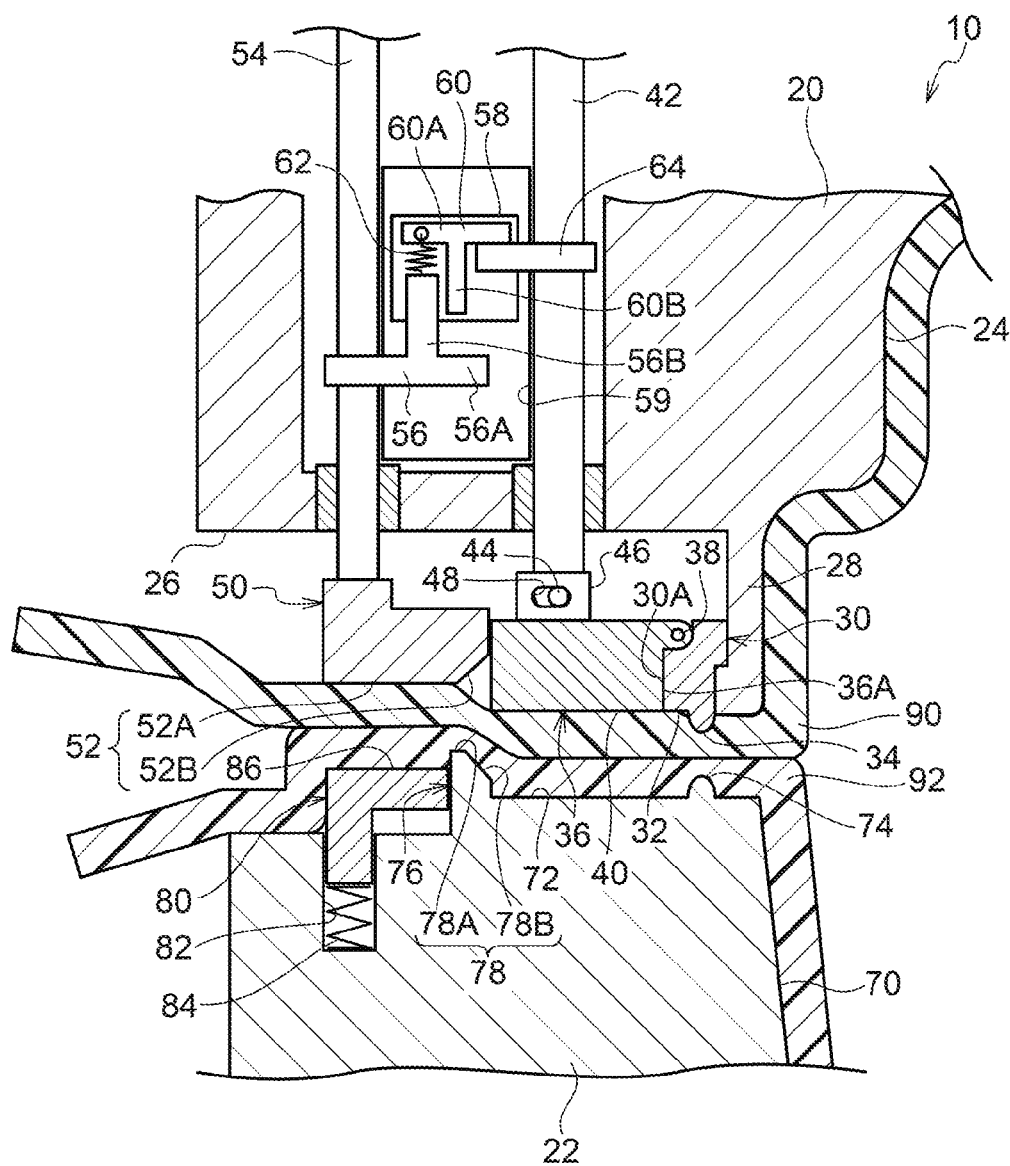
FIG. 5 is a vertical cross-section of relevant portions, illustrating a rotated state of a flange insert in a fuel tank flange section molding method according to the first exemplary embodiment.

Next, as illustrated in FIG. 5, the non-illustrated drive source is driven to make the rod 54 advance downward, such that the cut-off insert 50 is made to advance downward. When this is performed, the transmission member 56 fixed to the rod 54 moves downward, such that the transmission portion 58, to which the anchor member 60 coupled to the transmission member 56 by the spring 62 is fixed, also moves downward inside the groove 59. The horizontal portion 60A of the anchor member 60, which has been lowered together with the transmission portion 58, thereby presses the bar 64 fixed to the rod 42 downward, causing the rod 42 to move downward. The flange insert 36 is thereby rotated counterclockwise about the shaft body 38. As illustrated in FIG. 5, the rotation of the flange insert 36 is stopped due to an inside end face 36A of the flange insert 36 abutting an outside end face 30A of the fixed section 30, such that the mold face 32 of the fixed section 30 and the mold face 40 of the flange insert 36 are at the same height (are flush).

Note that, as illustrated in FIG. 5, when the rotation of the flange insert 36 has stopped, the mold face 52 (planar face 52A) of the cut-off insert 50 is in a retracted position that is further upward than the mold face 40 of the flange insert 36. Thus, the sheet bodies 90, 92 that have been joined together in the vicinity of the protruding portions 34, 74 are also joined from the inside between the mold face 40 and the flange face 72 accompanying the rotation of the flange insert 36, and excess molten resin is pressed toward the outside. The distance between the cut-off insert 50 and the abutting portion 76 of the lower mold 22 also becomes narrower, such that the sheet bodies 90, 92 are joined together between the mold face 52 and the mold face 78; however, prior to this, the sheet bodies 90, 92 are joined together from the inside by the rotation of the flange insert 36, such that air that was positioned between the sheet bodies 90, 92 is suppressed from remaining inside the molded flange section 18.

Figure 6:
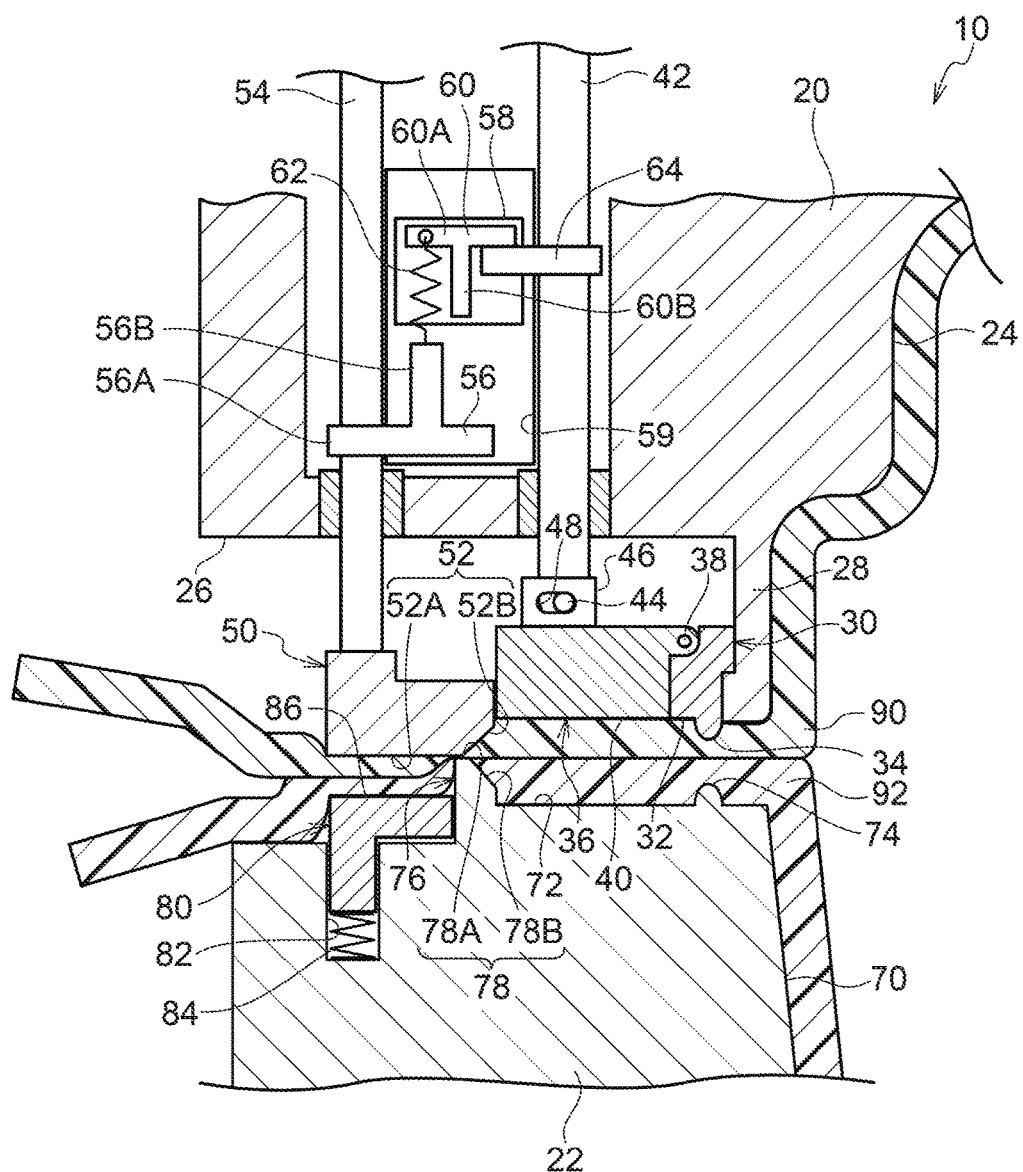
FIG. 6 is a vertical cross-section of relevant portions, illustrating an advanced state of a cut-off insert in a fuel tank flange section molding method according to the first exemplary embodiment.

Next, as illustrated in FIG. 6, the non-illustrated drive source is driven further such that the rod 54 moves further downward, and the cut-off insert 50 moves until abutting the abutting portion 76 of the lower mold 22. When this occurs, the flange insert 36 is incapable of rotating further, such that the rod 42 does not follow and move downward. The transmission portion 58, to which the anchor member 60 abutted by the bar 64 of the rod 42 is fixed, does not move either. The downward movement of the transmission member 56 of the rod 54 thereby causes the spring 62, which couples the transmission member 56 and the anchor member 60 together, to stretch.

The planar face 52A of the cut-off insert 50 abuts the planar face 78A of the abutting portion 76 of the lower mold 22, such that the sheet bodies 90, 92 are cut, while excess molten resin is pressed toward the outside. Note that the end portion of the flange section 18 is formed by the sloped face 52B of the cut-off insert 50 and the sloped face 78B of the abutting portion 76.

Thus, when closing the molds together in the molding device 10 and the fuel tank flange section molding method according to the present exemplary embodiment, first, the fixed section 30 and the lower mold 22 have a specific distance therebetween when joining the sheet bodies 90, 92 together. Next, the flange insert 36 is made to rotate such that the mold face 40, which had sloped upward on progression toward the outside of the flange insert 36, is at the same height (is in the same plane) as the mold face 32 of the fixed section 30. Next, the cut-off insert 50 is made to abut the lower mold 22. Namely, the joining of the sheet bodies 90, 92 that form the flange section 18 is performed in sequence from the inside, such that the joining is performed while pressing excess molten resin from the inside toward the outside. The sheet bodies 90, 92 are thereby joined while reliably dispelling air that was positioned between the sheet bodies 90, 92 toward the outside, such that air is suppressed from remaining between the joint faces of the sheet bodies 90, 92 forming the flange section 18.

Air is suppressed from remaining in the flange section 18 of the fuel tank 12 in this manner, thereby enabling sufficient strength of the flange section 18 to be secured when the fuel tank 12 is attached to the vehicle body through the flange section 18.

The molding device 10 is configured such that the rod 42 follows the rod 54, and so has an advantage in that one drive source is sufficient in order to drive both the flange insert 36 and the cut-off insert 50.

After the sheet bodies 90, 92 have been joined together in the vicinity of the protruding portions 34, 74 by setting the protruding portion 34 of the fixed section 30 and the protruding portion 74 of the lower mold 22 at a specific distance from each other by closing the molds together, the sheet bodies 90, 92 are joined together in sequence from the inside by the rotation of the mold face 40 of the flange insert 36 and the advance of the cut-off insert 50, and excess molten resin is pressed toward the outside. This enables the amount of molten resin flowing inside (toward the general faces 24, 70) from between the protruding portion 34 and the protruding portion 74 to be well controlled. This enables a thickened portion that is neither excessive nor insufficient to be formed at a base portion of the flange section 18 of the fuel tank 12.

Note that the molding device 10 is configured such that the rods 42, 54 are driven by one drive source; however, the rods 42, 54 may be driven by different drive sources. In such cases, there is no need to synchronize the timings of the rotation of the flange insert 36, and of the advancement or retraction of the cut-off insert 50, thereby enabling the drive timings to be independently set.

In the present exemplary embodiment, there is one flange insert 36; however, plural may be provided.

As a variation of the present exemplary embodiment, when shaping the sheet bodies in the molding device 10, the mold face 40 of the flange insert 36 that slopes upward on progression toward the outside may have an inside end portion that is at substantially the same height as (an outside end portion of) the mold face 32 of the fixed section 30, and an outside end portion that is at substantially the same height as the mold face 52 (the inside end portion of the planar face 52A) of the cut-off insert 50.

There is almost no unevenness at a boundary portion between the fixed section 30 (mold face 32) and the flange insert 36 (mold face 40), or at a boundary portion between the flange insert 36 (mold face 40) and the cut-off insert 50 (mold face 52) as a result. This suppresses formation of a recessed portion, in which there would be concern of air remaining after molding the flange section 18, in the sheet body 90 shaped by the respective mold faces 32, 40, 52 of the fixed section 30, the flange insert 36, and the cut-off insert 50.

Note that the sloped face 52B is formed at the flange insert 36 side of the mold face 52 of the cut-off insert 50, such that, strictly speaking, there is unevenness between the flange insert 36 and the cut-off insert 50. However, it is considered that there is almost no unevenness in the present exemplary embodiment (the height is substantially the same), as long as the evenness is of a degree at which no recessed portion is formed to the shaped sheet body 90.

In this manner, in the molding device 10 and the fuel tank flange section molding method, the outside end portion of the mold face 32 of the fixed section 30 and the inside end portion of the mold face 40 of the flange insert 36, and the outside end portion of the mold face 40 of the flange insert 36 and the inside end portion of the mold face 52 (planar face 52A) of the cut-off insert 50, are at substantially the same height. This enables a configuration in which almost no unevenness is provided between the fixed section 30 and the flange insert 36, or between the flange insert 36 and the cut-off insert 50, when shaping the sheet body 90. Namely, this enables a recessed portion, where there would be concern of air remaining during joining, to be suppressed from being formed in the shaped sheet body 90. This enables air to be further suppressed from remaining in the molded flange section 18. This enables sufficient strength to be secured in the flange section 18.

Second Exemplary Embodiment

Explanation follows regarding a fuel tank flange section molding device, and regarding a fuel tank flange section molding method employing the molding device, according to a second exemplary embodiment of the present disclosure. Note that similar configuration elements to those in the first exemplary embodiment are appended with the same reference numerals, and detailed explanation thereof is omitted.

Figure 7:
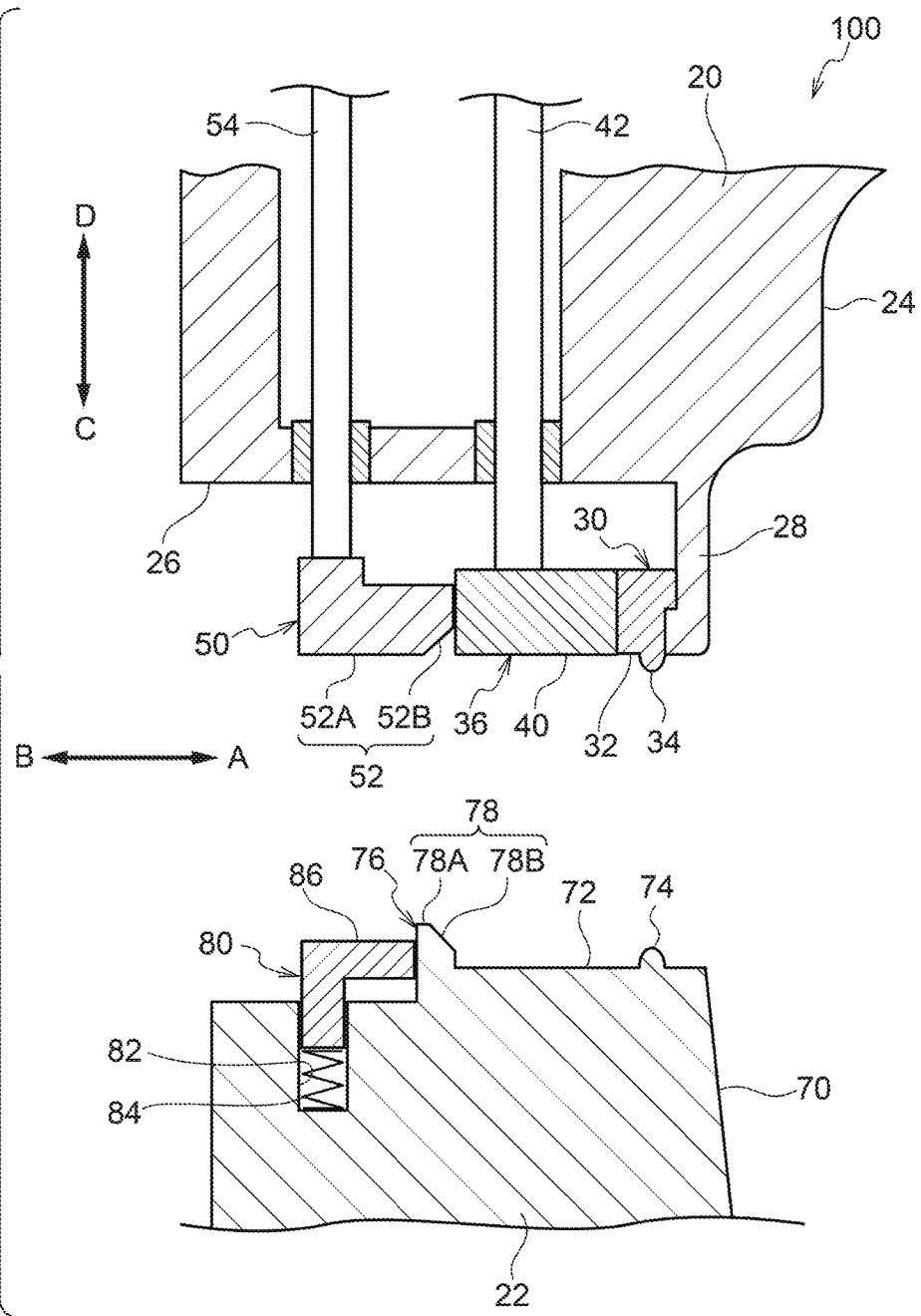
FIG. 7 is a vertical cross-section of relevant portions of a fuel tank flange section molding device according to a second exemplary embodiment.

As illustrated in FIG. 7, the flange insert 36 and the cut-off insert 50 are fixed to respective leading ends of the rods 42, 54, and a molding device 100 is configured capable of advancing and retracting from the upper mold 20 in the up-down direction. Note that the rods 42, 54 are each driven by a different drive source.

Explanation follows regarding the fuel tank flange section molding method according to the present exemplary embodiment, employing the molding device 100 formed in this manner.

Figure 8:
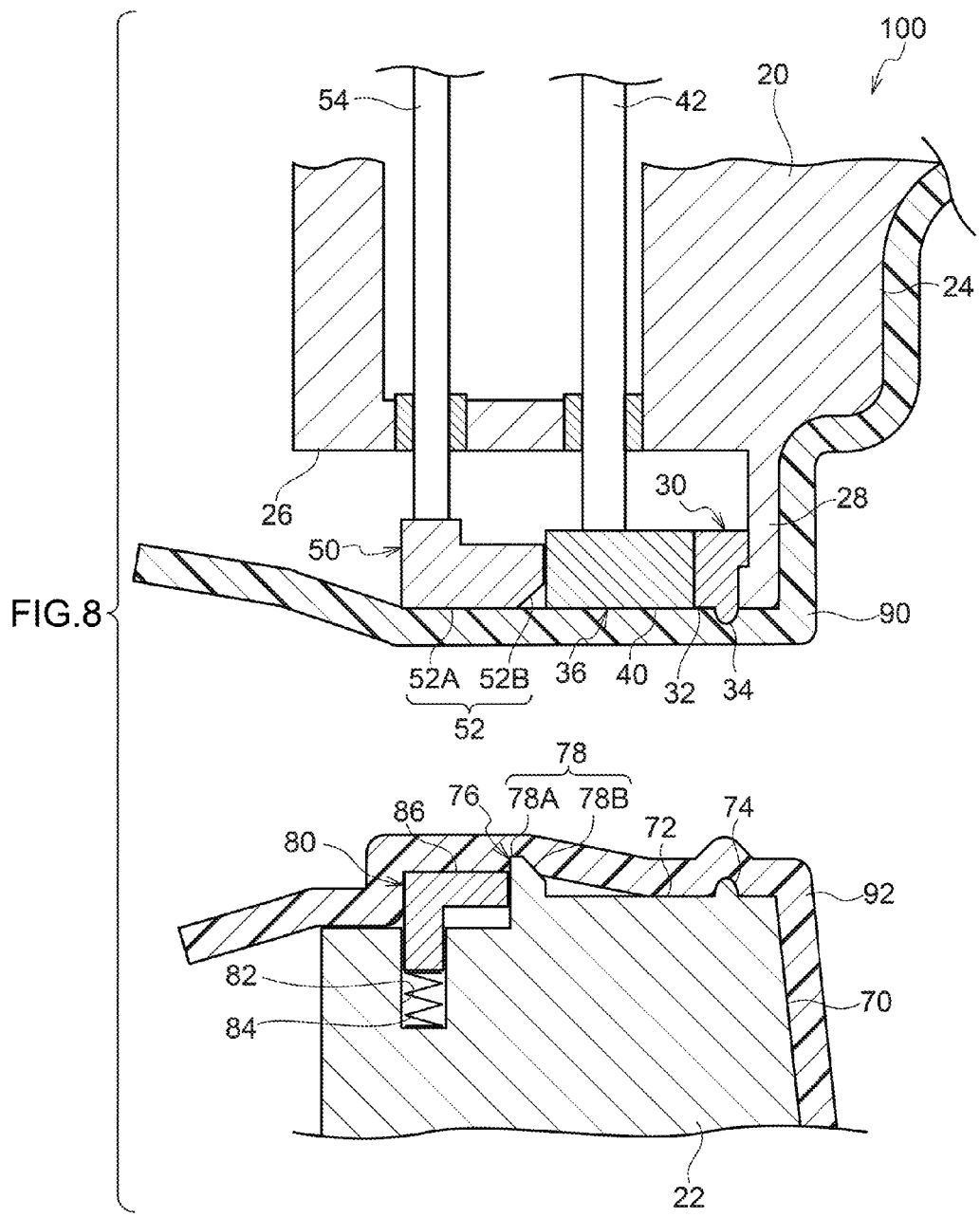
FIG. 8 is a vertical cross-section of relevant portions, illustrating a vacuum shaped state in a fuel tank flange section molding method according to the second exemplary embodiment.

First, as illustrated in FIGS. 7 and 8, in an opened state of the upper mold 20 and lower mold 22 of the molding device 100, the sheet bodies 90, 92 are shaped by the general faces 24, 70 and the flange faces 26, 72 of the upper mold 20 and the lower mold 22 by vacuum suction. When this is performed, as illustrated in FIGS. 7 and 8, the fixed section 30, the flange insert 36, and the cut-off insert 50 are disposed on the flange face 26, and the sheet body 90 is shaped by the respective mold faces 32, 40, 52 of the fixed section 30, the flange insert 36, and the cut-off insert 50. Note that the respective mold faces 32, 40, 52 (planar face 52A) of the fixed section 30, the flange insert 36, and the cut-off insert 50 are at the same height (are in the same plane).

Thus, as illustrated in FIG. 8, the sheet body 90 shaped by the mold faces 32, 40, 52 of the fixed section 30, the flange insert 36, and the cut-off insert 50 has almost no unevenness at the boundary portions between the fixed section 30 and the flange insert 36, and between the flange insert 36 and the cut-off insert 50. This suppresses formation of a recessed portion in the sheet body 90, inside which there would be concern of air remaining when molding the flange section 18.

Figure 9:
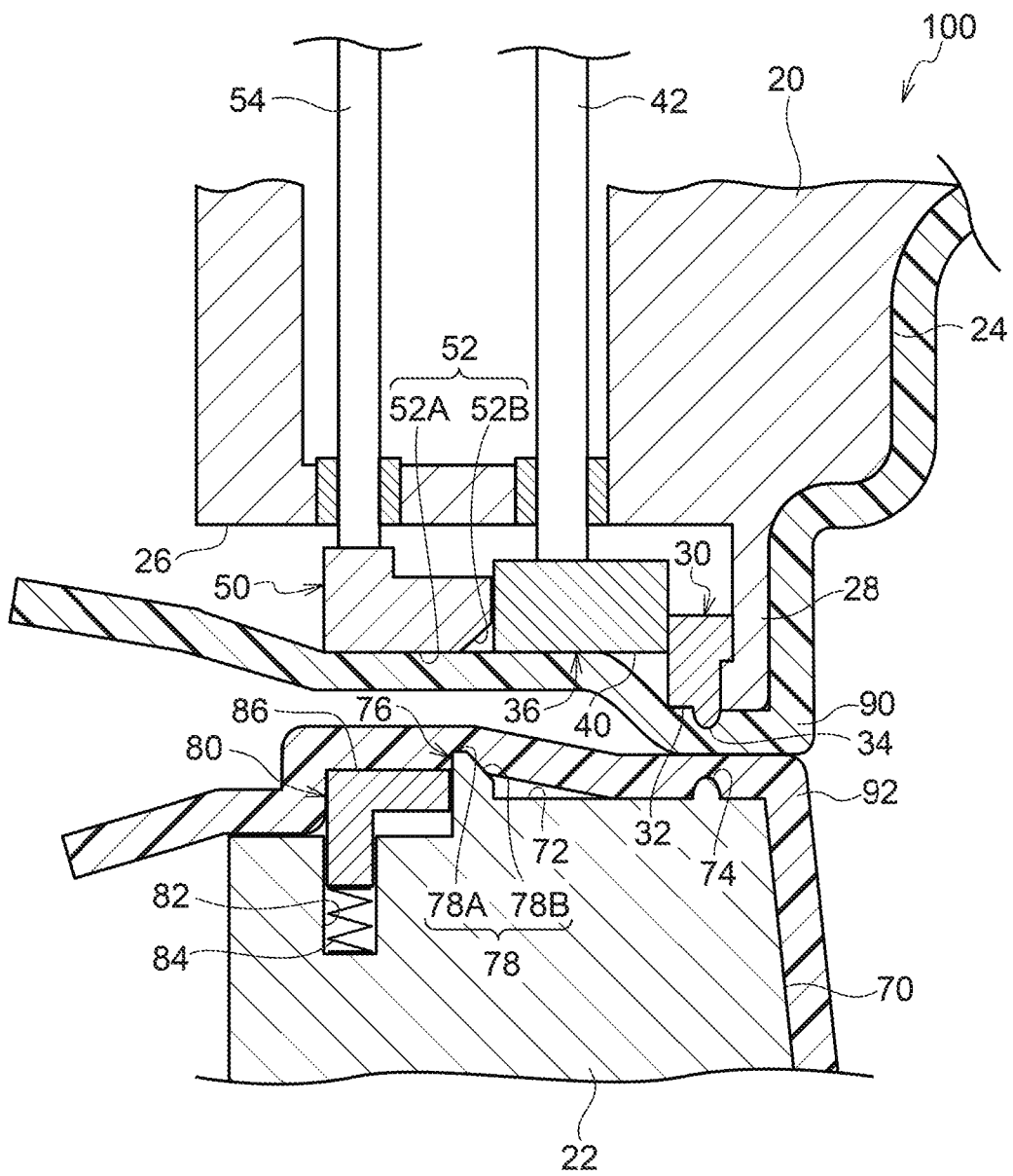
FIG. 9 is a vertical cross-section of relevant portions, illustrating a closed mold state in a fuel tank flange section molding method according to the second exemplary embodiment.

Next, as illustrated in FIG. 9, the upper mold 20 and the lower mold 22 are brought nearer to each other and closed together, such that the protruding portion 34 of the fixed section 30 and the protruding portion 74 of the lower mold 22 are disposed in positions separated by a specific distance, where the flange section 18 is molded.

When the upper mold 20 and the lower mold 22 are closed together, the non-illustrated drive sources are driven, and the rods 42, 54 each move upward inside the upper mold 20 by the same distance. Thus, as illustrated in FIG. 9, the respective mold faces 40, 52 of the flange insert 36 and the cut-off insert 50 are in retracted positions that are further upward than the mold face 32 of the fixed section 30. The sheet bodies 90, 92 forming the flange section 18 are thereby joined together in the vicinity of the protruding portions 34, 74.

Figure 10:
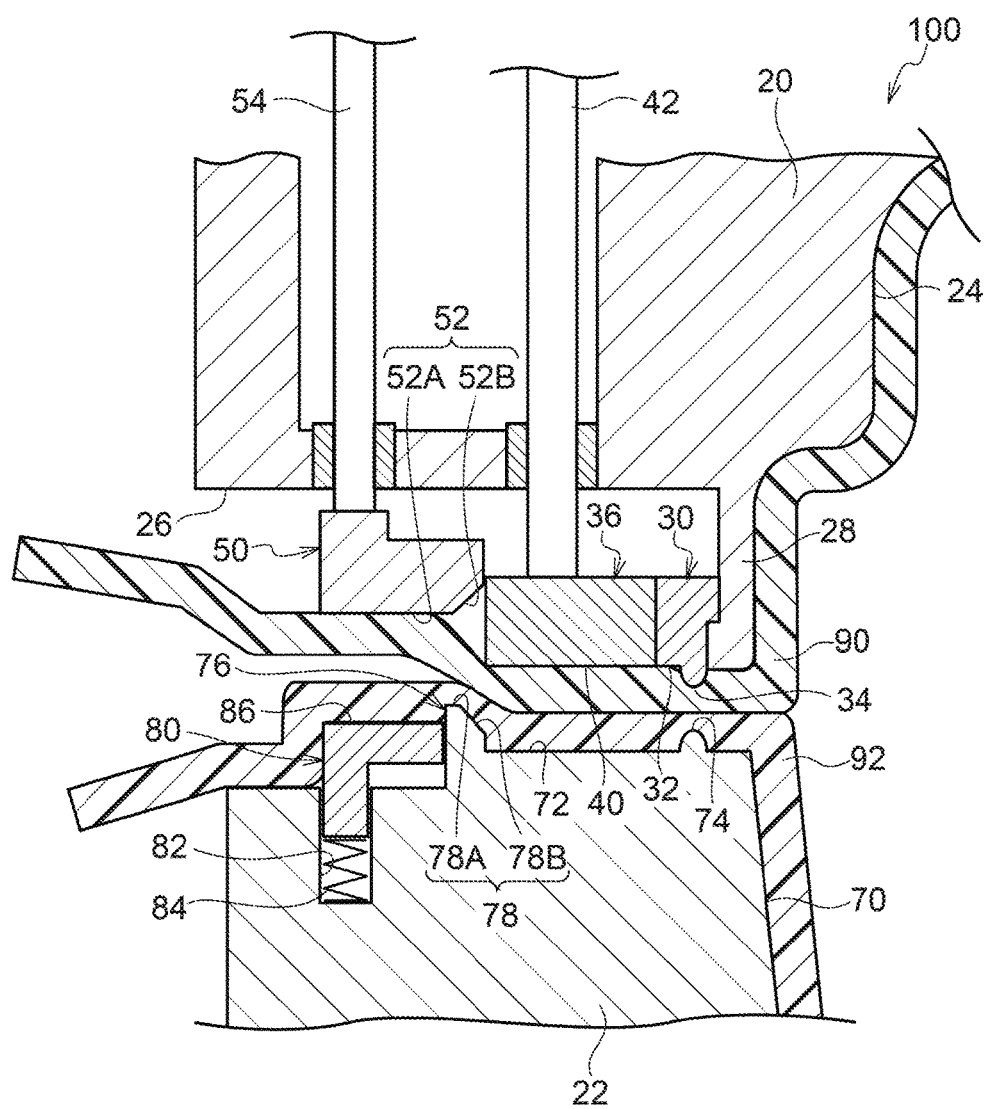
FIG. 10 is a vertical cross-section of relevant portions, illustrating an advanced state of a flange insert in a fuel tank flange section molding method according to the second exemplary embodiment.

Next, as illustrated in FIG. 10, the non-illustrated drive source of the rod 42 is driven to make the rod 42 advance downward, such that the flange insert 36 is made to advance downward to a specific position, and the mold face 32 of the fixed section 30 and the mold face 40 of the flange insert 36 are made to be at the same height (in the same plane).

When this is performed, the mold face 52 (planar face 52A) of the cut-off insert 50 stays in its position, without advancing downward. Thus, the sheet bodies 90, 92 that have been joined together in the vicinity of the protruding portions 34, 74 are also joined together from the inside between the mold face 40 and the flange face 72 accompanying the advance (lowering) of the flange insert 36, and air that was positioned between the sheet bodies 90, 92 is dispelled toward the outside.

Figure 11:
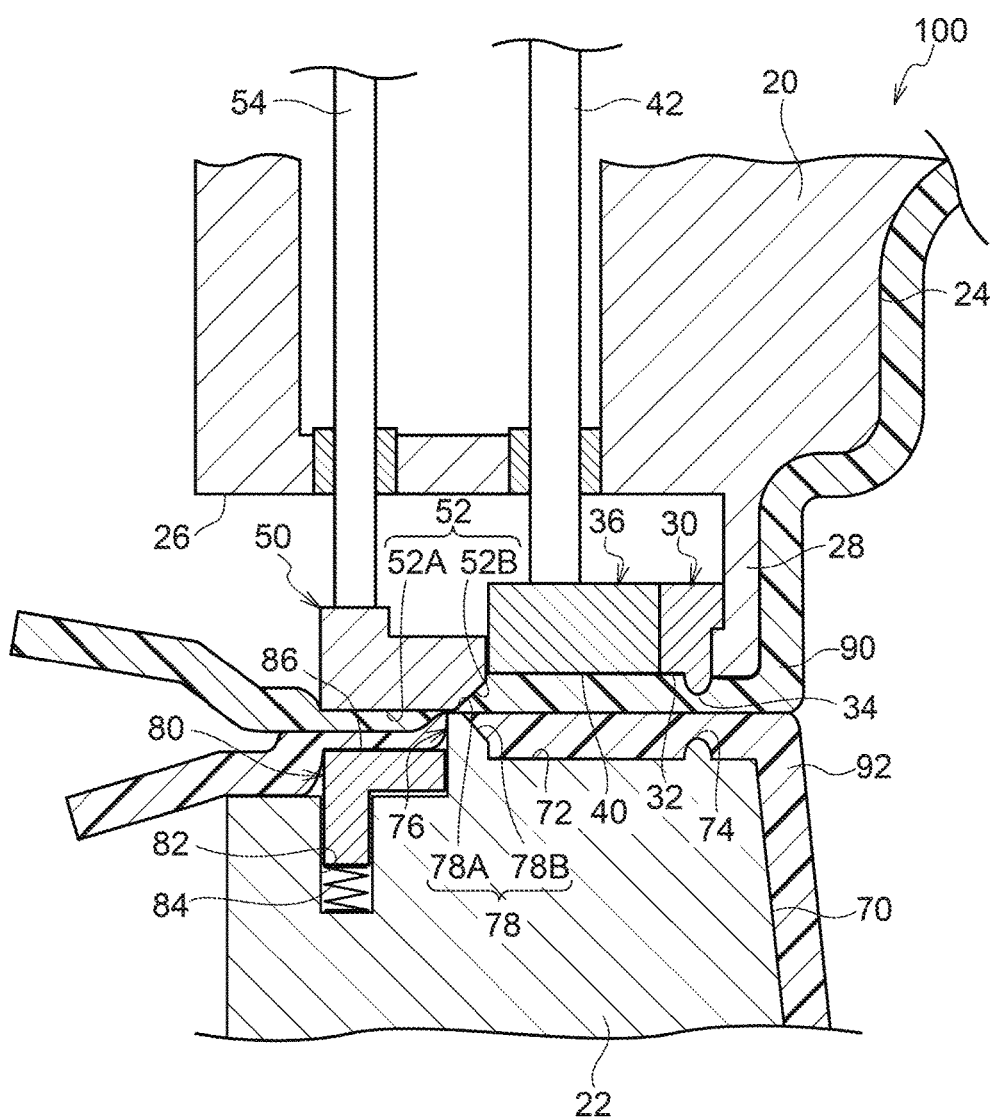
FIG. 11 is a vertical cross-section of relevant portions, illustrating an advanced state of a cut-off insert in a fuel tank flange section molding method according to the second exemplary embodiment.

Furthermore, as illustrated in FIG. 11, the rod 54 is made to move downward by driving the non-illustrated drive source of the rod 54, and the cut-off insert 50 is made to move until abutting the abutting portion 76 of the lower mold 22. Namely, the planar face 52A of the cut-off insert 50 abuts the planar face 78A of the abutting portion 76 of the lower mold 22. Excess molten resin is thereby pressed toward the outside while the sheet bodies 90, 92 are joined together from the inside between the mold face 52 and the mold face 78, and the sheet bodies 90, 92 are cut at portions forming the outside end portion of the flange section 18. Note that the outside end portion of the flange section 18 is formed by the sloped face 52B of the cut-off insert 50 and the sloped face 78B of the abutting portion 76.

Thus, when the sheet bodies 90, 92 are being joined together in the molding device 10 and the fuel tank flange section molding method according to the present exemplary embodiment, first, when the molds have been closed together, the flange insert 36 and the cut-off insert 50 are made to retract (rise) relative to the fixed section 30, and a specific distance for molding the flange section 18 is set between the fixed section 30 and the lower mold 22. Next, the flange insert 36 is made to advance (lower) to a specific distance from the lower mold 22. Finally, the cut-off insert 50 is made to advance (lower) and to abut the lower mold 22. The fixed section 30, the flange insert 36 and the cut-off insert 50 are accordingly disposed in sequence from the fixed section 30 at the inside, at positions for molding the flange section 18 at specific distances from (including abutting) the lower mold 22. Thus, the sheet bodies 90, 92 forming the flange section 18 are joined together in sequence from the inside, and excess molten resin is pressed toward the outside. Thus, air that was present between the sheet bodies 90, 92 is dispelled to the outside, and air is suppressed from remaining between the joint faces of the sheet bodies 90, 92 forming the flange section 18.

The respective mold faces 32, 40, 52 (planar face 52A) of the fixed section 30, the flange insert 36, and the cut-off insert 50 are at the same height during shaping. Namely, there is almost no unevenness provided between the fixed section 30 and the flange insert 36, or between the flange insert 36 and the cut-off insert 50, when shaping the sheet body 90. This enables a recessed portion where air would remain to be suppressed from being formed in the shaped sheet body 90.

In particular, in the molding method of the flange section 18 of the fuel tank 12 employing the molding device 100 according to the present exemplary embodiment, the mold face 32 of the fixed section 30, the mold face 40 of the flange insert 36, and the mold face 52 (planar face 52A) of the cut-off insert 50 are disposed in the same plane with respect to the upper mold 20 of the sheet body 90 during vacuum shaping. Thus, the shaped sheet body 90 is less liable to be formed with a recessed portion, and air is further suppressed from remaining in the formed flange section 18. This enables sufficient strength to be secured in the flange section 18.

Note that in the present exemplary embodiment, the flange insert 36 and the cut-off insert 50 are made to retract to be at the same height with respect to the fixed section 30 when closing the molds together; however, the amount by which the cut-off insert 50 retracts may be increased.

What is claimed is:

1. A fuel tank flange section molding device comprising:
   an upper mold and a lower mold that are closed together to mold a fuel tank;
   a fixed section that is fixed to the upper mold, the fixed section includes a mold face that molds a flange section extending from an outside face of a side wall of a fuel tank main body of the fuel tank in a direction intersecting with the outside face and a protruding portion projecting out from the mold face of the fixed section toward the lower mold, and the fixed section controls an amount of molten resin flowing toward a fuel tank main body side due to the protruding portion being disposed nearer to the lower mold than the mold face of the fixed section when the upper and lower molds have been closed together;
   a flange insert that is provided adjacent to the fixed section in the upper mold at an opposite side from the fuel tank main body side, and the flange insert includes a mold face capable of rotating about the fixed section to an angle sloped toward a retracting direction of the upper mold, with respect to an extension direction of the flange section; and
   a cut-off insert that is provided adjacent to the flange insert in the upper mold at the opposite side from the fuel tank main body side, the cut-off insert includes a mold face that forms an end portion of the flange section at the opposite side from the fuel tank main body, and the cut-off insert is capable of retracting from the upper mold with respect to the lower mold.

2. The fuel tank flange section molding device of claim 1, wherein the cut-off insert is configured to be driven and the flange insert follows the driving of the cut-off insert.

3. A method of molding a fuel tank flange section utilizing the fuel tank flange section molding device of claim 1, the method comprising:
   shaping sheet bodies formed from molten resin in the upper mold and the lower mold, respectively;
   closing the upper mold and the lower mold together to dispose the fixed section with respect to the lower mold in a position for molding the flange section;
   rotating the flange insert about the fixed section to change the mold face of the flange insert, from a state in which the mold face of the flange insert is sloped toward the retracting direction of the upper mold, with respect to the extension direction of the flange section, to a state in which the mold face of the flange insert is at a same height as the mold face of the fixed section; and
   causing the cut-off insert to advance toward the lower mold, and to be abutted by the lower mold.

4. The method of claim 3, wherein:
   shaping the sheet bodies formed from molten resin in the lower mold and the upper mold includes shaping the sheet bodies in a state in which the mold face of the flange insert is sloped in the retracting direction of the upper mold, with respect to the extension direction of the flange section, an end portion of the mold face of the fixed section at the opposite side to the fuel tank main body and an end portion of the mold face of the flange insert at the fuel tank main body side are at substantially the same height as each other, and an end portion of the mold face of the cut-off insert at the fuel tank main body side and an end portion of the mold face of the flange insert at the opposite side to the fuel tank main body are at substantially the same height as each other.

5. A fuel tank flange section molding device comprising:
   an upper mold and a lower mold that are closed together to mold a fuel tank;
   a fixed section that is fixed to the upper mold, the fixed section includes a mold face that molds a flange section extending from an outside face of a side wall of a fuel tank main body of the fuel tank in a direction intersecting with the outside face and a protruding portion projecting out from the mold face of the fixed section toward the lower mold, and the fixed section controls an amount of molten resin flowing toward a fuel tank main body side due to the protruding portion being disposed nearer to the lower mold than the mold face of the fixed section when the upper and lower molds have been closed together;
   a flange insert that is provided adjacent to the fixed section in the upper mold at an opposite side from the fuel tank main body, the flange insert includes a mold face that molds the flange section, and the flange insert is capable of advancing and retracting from the upper mold with respect to the lower mold; and
   a cut-off insert that is provided adjacent to the flange insert in the upper mold at the opposite side from the fuel tank main body, the cut-off insert includes a mold face forming an end portion of the flange section at the opposite side from the fuel tank main body, and the cut-off insert is provided so as to be capable of advancing and retracting from the upper mold with respect to the lower mold.

6. A method of molding a fuel tank flange section utilizing the fuel tank flange section molding device of claim 5, the method comprising:
   shaping sheet bodies formed from molten resin in the upper mold and the lower mold, in a state in which the respective mold faces of the fixed section, the flange insert, and the cut-off insert are at substantially the same height as each other;
   closing the upper mold and the lower mold together to relatively retract the mold face of the flange insert in a retracting direction of the upper mold, with respect to the mold face of the fixed section, to relatively retract the mold face of the cut-off insert in the upper mold retracting direction to the position of the mold face of the flange insert or further, and to dispose the fixed section with respect to the lower mold in a position for molding the flange section;

causing the flange insert to advance toward the lower mold, so as to be at a same height as the mold face of the fixed section; and causing the cut-off insert to advance further toward the lower mold side than the flange insert, and to be abutted by the lower mold.

* * * * *